(12) United States Patent
Lee

(10) Patent No.: US 11,312,414 B2
(45) Date of Patent: Apr. 26, 2022

(54) MOTOR DRIVEN POWER STEERING AND CONTROL METHOD THEREOF

(71) Applicant: HYUNDAI MOBIS CO., LTD., Seoul (KR)

(72) Inventor: Pil Woo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 301 days.

(21) Appl. No.: 16/389,727

(22) Filed: Apr. 19, 2019

(65) Prior Publication Data

US 2019/0329820 A1 Oct. 31, 2019

(30) Foreign Application Priority Data

Apr. 25, 2018 (KR) ........................ 10-2018-0047733

(51) Int. Cl.
| | |
|---|---|
| *B62D 6/08* | (2006.01) |
| *B62D 6/00* | (2006.01) |
| *B62D 5/04* | (2006.01) |
| *B60W 10/20* | (2006.01) |

(52) U.S. Cl.
CPC ............. *B62D 6/008* (2013.01); *B60W 10/20* (2013.01); *B62D 5/0463* (2013.01); *B62D 5/0481* (2013.01); *B62D 6/005* (2013.01); *B60W 2520/10* (2013.01); *B60W 2520/14* (2013.01)

(58) Field of Classification Search
CPC . B62D 5/0463; B60W 10/20; B60W 2710/20; B60W 2520/14; B60W 2510/202; B60W 2710/202; B60W 2520/105
See application file for complete search history.

(56) References Cited

U.S. PATENT DOCUMENTS

| | | | | |
|---|---|---|---|---|
| 2014/0336877 | A1* | 11/2014 | Kim ..................... | B60W 10/04 701/41 |
| 2015/0025743 | A1* | 1/2015 | Tamura .................... | B62D 6/00 701/41 |
| 2018/0208178 | A1* | 7/2018 | Owen .................... | B60W 20/11 |
| 2018/0265127 | A1* | 9/2018 | Walsh .................. | B62D 5/0463 |

FOREIGN PATENT DOCUMENTS

KR 10-2013-0033767 A 4/2013

\* cited by examiner

*Primary Examiner* — Kenneth J Malkowski
(74) *Attorney, Agent, or Firm* — NSIP Law

(57) ABSTRACT

Disclosed herein are Motor-Driven Power Steering (MDPS) and a control method thereof. The MDPS includes an information detection unit configured to detect information about the behavior of a vehicle; and a controller configured to receive the information about the behavior of the vehicle from the information detection unit, to determine whether the vehicle is accelerating and whether the vehicle pulls to one side, and to generate compensation torque and drive a driving motor based thereon.

10 Claims, 2 Drawing Sheets

MOTOR DRIVEN POWER STEERING AND CONTROL METHOD THEREOF

CROSS-REFERENCES TO RELATED APPLICATIONS

The present application claims priority to Korean application number 10-2018-0047733, filed on Apr. 25, 2018, which is incorporated by reference in its entirety.

BACKGROUND OF THE INVENTION

The present invention relates to motor-driven power steering and a control method thereof, and more particularly, to motor-driven power steering and a control method thereof, which prevent a vehicle from pulling to one side by receiving information about the behavior of the vehicle and outputting compensation torque when the steering pull of the vehicle is detected during acceleration although a driver does not steer the vehicle.

In general, a vehicle has a steering system configured with a steering wheel, which is installed in front of the driver's seat in the vehicle, and a steering shaft connected to the rotation axis of the steering wheel. Accordingly, when a driver turns the steering wheel, the rotation axis thereof and the steering shaft are rotated, and the front wheels of the vehicle are turned to the left or right, whereby the direction in which the vehicle is driving is changed.

In such a steering system, when a vehicle is steered by directly delivering torque, with which a driver turns a steering wheel, to a steering shaft, a large amount of force is required when the driver turns the steering wheel.

In order to alleviate the force required when a driver turns a steering wheel, a hydraulic steering system, which uses a hydraulic actuator when the steering wheel is manipulated, is commercialized.

Because the existing steering systems, including a hydraulic steering system, are mechanical systems in which a steering wheel is mechanically connected with tires, when a vehicle crashes, a driver is more likely to suffer from injuries due to a protruding steering shaft connected with the steering wheel. Also, because the hydraulic actuator of a hydraulic steering system uses the power of an engine, it reduces the output of the engine and limits the amount of power for augmenting steering power. Further, a large number of hydraulic equipment and components make the structures thereof complicated.

Accordingly, Motor-Driven Power Steering (MDPS), configured such that, when a driver turns a steering wheel, an electric actuator installed in the steering system of a vehicle is driven, thereby making the front wheels of the vehicle turn to the left or right and changing the direction in which the vehicle is driving, has been recently applied.

Such MDPS is configured to determine the driving conditions of a vehicle using sensors, such as a torque sensor for measuring driver's steering torque inputted to a steering wheel, a steering angle sensor for measuring the steering angle of the steering wheel, a vehicle speed sensor for measuring the vehicle speed, and the like, and to steer the vehicle by adjusting a current supplied to a driving actuator such as a motor.

The related art of the present invention is disclosed in Korean Patent Application Publication No. 10-2013-0033767 published on Apr. 4, 2013 and entitled "Torque steer compensation method of Motor-Driven Power Steering".

SUMMARY OF THE INVENTION

The conventional system is problematic in that a vehicle pulls to one side during acceleration due to the difference between driving torque delivered to the left side and that delivered to the right side because the vehicle does not have the same structure on the left and right sides due to the arrangement of an engine and a transmission, whereby the stability of the vehicle is reduced.

Embodiments of the present invention are directed to Motor-Driven Power Steering (MDPS) and a control method thereof, which prevent a vehicle from pulling to one side by receiving information about the behavior of the vehicle and outputting compensation torque when the steering pull of the vehicle is detected during acceleration although a driver does not steer the vehicle.

In one embodiment, Motor-Driven Power Steering (MDPS) may include: an information detection unit configured to detect information about the behavior of a vehicle; and a controller configured to receive the information about the behavior of the vehicle from the information detection unit, to determine whether the vehicle is accelerating and whether the vehicle pulls to one side, and to generate compensation torque and drive a driving motor.

The information detection unit may include a vehicle speed sensing unit configured to detect the driving speed of the vehicle; a torque sensing unit configured to detect column torque applied to a steering shaft and to output a column torque signal; a steering angle sensing unit configured to detect the steering angle of a steering wheel; an accelerator pedal displacement sensing unit configured to sense the displacement of an accelerator pedal; and a yaw rate sensing unit configured to sense the yaw rate of the vehicle.

The controller may include a vehicle condition determination unit configured to determine whether a driver intends to steer the vehicle based on the steering angle and the column torque; an acceleration determination unit configured to determine whether the vehicle is accelerating based on the displacement of the accelerator pedal; a steering pull determination unit configured to determine whether the vehicle pulls to one side based on the yaw rate; and a compensation torque generation unit configured to receive information about whether the driver intends to steer the vehicle from the vehicle condition determination unit, to receive information about whether the vehicle is accelerating and information about whether the vehicle pulls to one side from the acceleration determination unit and the steering pull determination unit, respectively, to calculate the compensation torque based on the information, and to output a final compensation current.

The compensation torque generation unit may receive the driving speed from the vehicle speed sensing unit and calculate the compensation torque by applying a gain based on a vehicle speed.

The compensation torque generation unit may calculate the compensation torque for compensating for a steering pull when it is determined that the vehicle pulls to one side during acceleration although the driver does not intend to steer the vehicle.

The compensation torque generation unit may cancel the compensation torque by ramping down the compensation torque when it is determined that the vehicle does not pull to one side any longer.

In another embodiment, a method for controlling Motor-Driven Power Steering (MDPS) may include: receiving, by a controller, information about the behavior of a vehicle from an information detection unit; determining, by the controller, whether a driver intends to steer the vehicle based on the information about the behavior of the vehicle; determining, by the controller, whether the vehicle pulls to one side during acceleration based on the information about the behavior of the vehicle; calculating, by the controller, compensation torque depending on the determination of whether the driver intends to steer the vehicle and whether the vehicle pulls to one side during acceleration; and outputting, by the controller, a final compensation current to a driving motor based on the compensation torque.

The receiving of the information about the behavior of the vehicle may be configured such that the controller receives the driving speed of the vehicle, column torque applied to a steering shaft, the steering angle of a steering wheel, the displacement of an accelerator pedal, and the yaw rate of the vehicle from the information detection unit.

The determining of whether the driver intends to steer the vehicle may be configured such that the controller determines whether the driver intends to steer the vehicle based on the column torque and the steering angle.

The determining of whether the vehicle pulls to one side during acceleration may include determining, by the controller, whether the vehicle is accelerating based on the displacement of the accelerator pedal when it is determined that the driver does not intend to steer the vehicle; and determining, by the controller, whether the vehicle pulls to one side based on the yaw rate when it is determined that the vehicle is accelerating.

The calculating of the compensation torque may be configured such that the controller receives a driving speed from the information detection unit and calculates the compensation torque by applying a gain based on a vehicle speed.

The method may further include cancelling, by the controller, the compensation torque by ramping down the compensation torque when it is determined that the vehicle does not pull to one side any longer during acceleration.

DESCRIPTION OF SPECIFIC EMBODIMENTS

Figure 1:
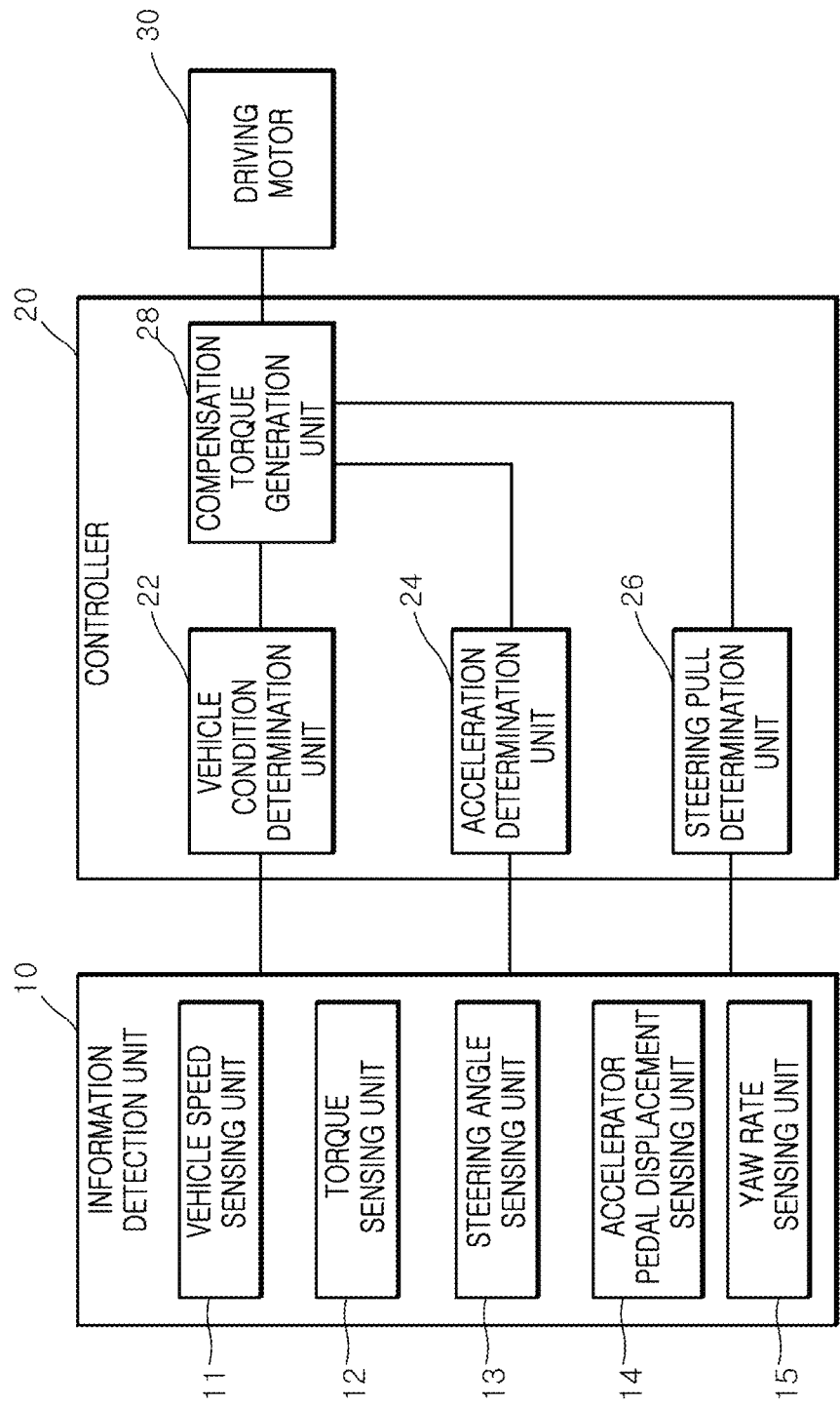
FIG. 1 is a block diagram illustrating Motor-Driven Power Steering (MDPS) in accordance with an embodiment of the present invention.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, Motor-Driven Power Steering (MDPS) and a control method thereof in accordance with embodiments of the invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a block diagram illustrating Motor-Driven Power Steering (MDPS) according to an embodiment of the present invention.

As shown in FIG. 1, the MDPS according to an embodiment of the present invention includes an information detection unit 10 and a controller 20.

The information detection unit 10 detects information about the overall behavior of a driving vehicle and provides the same to the controller 20.

Here, the information detection unit 10 includes a vehicle speed sensing unit 11, a torque sensing unit 12, a steering angle sensing unit 13, an accelerator pedal displacement sensing unit 14, and a yaw rate sensing unit 15.

The vehicle speed sensing unit 11 detects the driving speed of the vehicle and provides the same.

The torque sensing unit 12 detects column torque applied to a steering shaft (not illustrated) and provides a column torque signal, whereby whether a driver intends to steer the vehicle may be determined.

The steering angle sensing unit 13 detects the steering angle of a steering wheel and provides the same, whereby whether the driver intends to steer the vehicle may be determined.

The accelerator pedal displacement sensing unit 14 detects the displacement of an accelerator pedal and provides the same, whereby whether the vehicle is accelerating may be determined. Alternatively, instead of the accelerator pedal displacement sensing unit 14, an accelerator pedal open sensing unit detecting an opening rate of the accelerator pedal may be applied.

The yaw rate sensing unit 15 provides a yaw rate by detecting the tilt of the vehicle, whereby whether the vehicle pulls to one side may be determined.

The controller 20 receives the information about the behavior of the vehicle from the information detection unit 10, thereby determining whether the driver intends to steer the vehicle based on the column torque and the steering angle.

Also, the controller 20 determines whether the vehicle is accelerating based on the displacement of the accelerator pedal and determines whether the vehicle pulls to one side based on the yaw rate. Here, the displacement of the accelerator pedal and the yaw rate are included in the information about the behavior of the vehicle, which is inputted from the information detection unit 10. When it is determined that the vehicle pulls to one side during acceleration although the driver does not steer the vehicle, the controller 20 calculates compensation torque in the opposite direction of the steering pull and outputs a final compensation current, thereby driving a driving motor 30.

Here, the controller 20 may include a vehicle condition determination unit 22, an acceleration determination unit 24, a steering pull determination unit 26, and a compensation torque generation unit 28.

The vehicle condition determination unit 22 may determine whether the driver intends to steer the vehicle by comparing the column torque and the steering angle, included in the information about the behavior of the vehicle, with reference column torque and a reference steering angle, respectively. Here, the reference column torque and the reference steering angle are set based on the vehicle The acceleration determination unit 24 may determine whether the vehicle is accelerating by comparing the displacement of the accelerator pedal, included in the information about the behavior of the vehicle, with a reference displacement set based on the vehicle. Alternatively, the acceleration determination unit 24 may determine whether the vehicle is accelerating by comparing the opening rate of the accelerator pedal with a reference opening rate set based on the vehicle.

The steering pull determination unit 26 may determine whether the vehicle pulls to one side by comparing the yaw rate included in the information about the behavior of the vehicle with a reference yaw rate set based on the vehicle.

The compensation torque generation unit 28 receives the result of determination of whether the driver intends to steer the vehicle from the vehicle condition determination unit 22, receives information about whether the vehicle is accelerating and information about whether the vehicle pulls to one side from the acceleration determination unit 24 and the steering pull determination unit 26, respectively, calculates compensation torque in the opposite direction of the steering pull when it is determined that the vehicle pulls to one side during acceleration although the driver does not intend to steer the vehicle, and outputs a final compensation current to the driving motor 30 based on the compensation torque.

Here, the compensation torque generation unit 28 receives the driving speed from the vehicle speed sensing unit 11, calculates the compensation torque by applying gain based on a vehicle speed, and outputs the final compensation current by a tuning map, which refers to the output of an engine and the driving speed, to the driving motor 30.

Meanwhile, when the steering pull of the vehicle does not occur during acceleration, that is, when it is determined that the driver intends to steer the vehicle, that the vehicle is not accelerating, or that the vehicle does not pull to one side, the controller 20 cancels the compensation torque by ramping down the compensation torque, thereby minimizing the sense of difference in steering.

As described above, the MDPS according to an embodiment of the present invention receives information about the behavior of a vehicle and outputs compensation torque when the steering pull of the vehicle is detected during acceleration although a driver does not steer the vehicle, thereby preventing the vehicle from pulling to one side. Accordingly, when the vehicle drives straight ahead, the driving performance of the vehicle during acceleration may be improved, and the stability of the vehicle may be improved.

Figure 2:
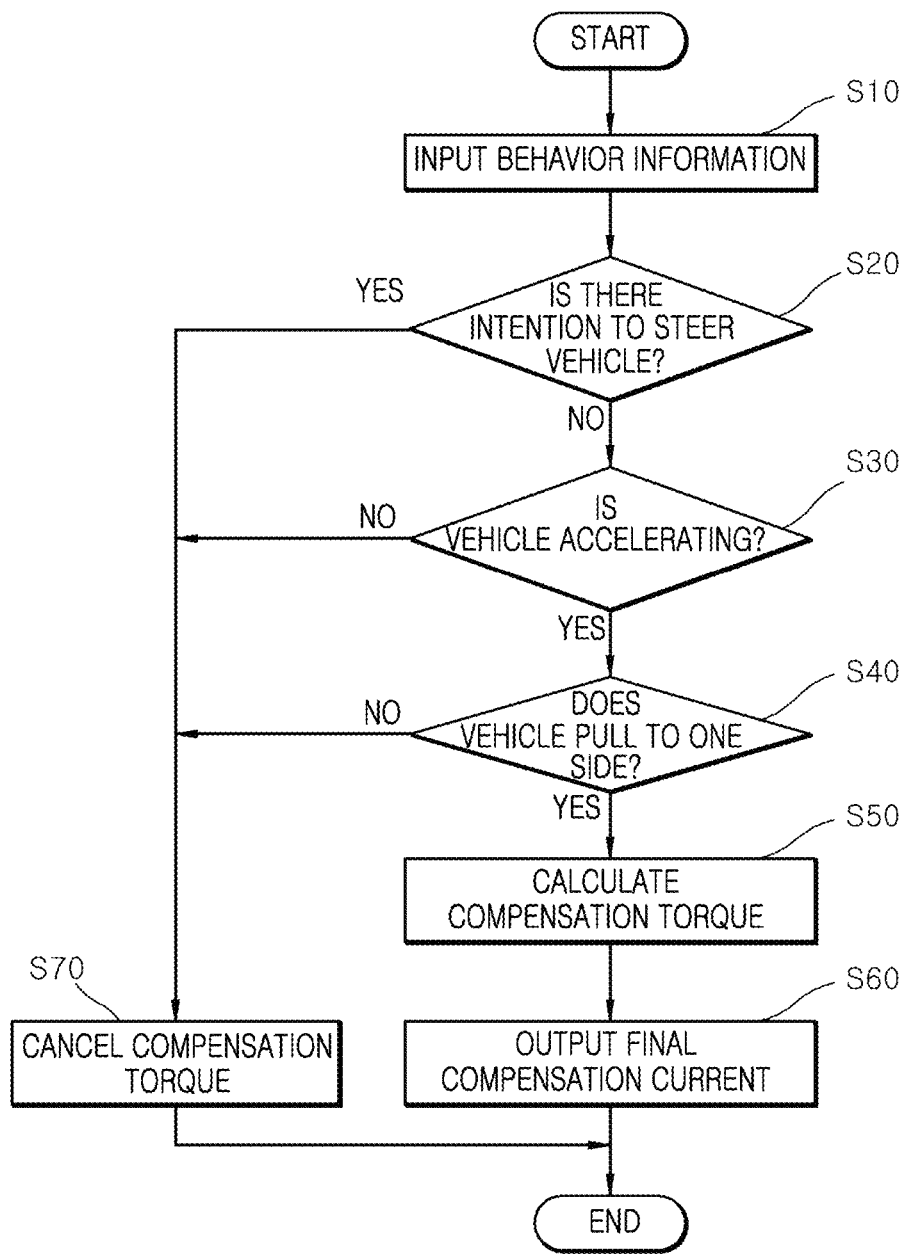
FIG. 2 is a flowchart for explaining a method for controlling MDPS in accordance with an embodiment of the present invention.

FIG. 2 is a flowchart for explaining a method for controlling Motor-Driven Power Steering (MDPS) according to an embodiment of the present invention.

As shown in FIG. 2, in the method for controlling MDPS according to an embodiment of the present invention, first, the controller 20 receives information about the behavior of a vehicle from the information detection unit 10 at step S10.

Here, the controller 20 may receive the driving speed of the vehicle, column torque applied to a steering shaft, the steering angle of a steering wheel, the displacement of an accelerator pedal, and the yaw rate of the vehicle from the information detection unit 10.

After it receives the information about the behavior of the vehicle at step S10, the controller 20 may determine at step S20 whether a driver intends to steer the vehicle by comparing the column torque and the steering angle, included in the information about the behavior of the vehicle, with reference column torque and a reference steering angle, respectively. Here, the reference column torque and the reference steering angle are set based on the vehicle.

When it is determined at step S20 that the driver does not intend to steer the vehicle, the controller 20 may determine at step S30 whether the vehicle is accelerating by comparing the displacement of the accelerator pedal, which is included in the information about the behavior of the vehicle, with a reference displacement set based on the vehicle. Alternatively, the controller 20 may determine whether the vehicle is accelerating by comparing the opening rate of the accelerator pedal with a reference opening rate set based on the vehicle.

Then, when it is determined at step S30 that the vehicle is accelerating, the controller 20 may determine at step S40 whether the vehicle pulls to one side by comparing the yaw rate included in the information about the behavior of the vehicle with a reference yaw rate set based on the vehicle.

When it is determined at step S40 that the vehicle pulls to one side, the controller 20 calculates compensation torque at step S50 by receiving the driving speed from the information detection unit 10 and by applying gain based on a vehicle speed.

After it calculates the compensation torque at step S50, the controller 20 outputs the final compensation current by a tuning map, which refers to the output of the engine and the driving speed, to the driving motor 30, thereby preventing the vehicle from pulling to one side at step 60.

Conversely, when it is determined at step 20 that the driver intends to steer the vehicle, when it is determined at step S30 that the vehicle is not accelerating, or when it is determined at step S40 that the vehicle does not pull to one side, the controller 20 determines that the compensation torque should be canceled and cancels the compensation torque by ramping down the same, thereby minimizing the sense of difference in steering at step S70.

As described above, according to the method for controlling MDPS in accordance with an embodiment of the present invention, a vehicle is prevented from pulling to one side by receiving information about the behavior of the vehicle and by outputting compensation torque when the steering pull of the vehicle is detected during acceleration although a driver does not steer the vehicle. Accordingly, when the vehicle drives straight ahead, driving performance during acceleration may be improved, and stability may be improved.

Motor-Driven Power Steering (MDPS) and a control method thereof according to one aspect of the present invention prevent a vehicle from pulling to one side by receiving information about the behavior of the vehicle and by outputting compensation torque when the steering pull of the vehicle is detected during acceleration although a driver does not steer the vehicle, whereby driving performance during acceleration may be improved when the vehicle drives straight ahead, and the stability may also be improved.

Although preferred embodiments of the invention have been disclosed for illustrative purposes, those skilled in the art will appreciate that various modifications, additions and substitutions are possible, without departing from the scope and spirit of the invention as defined in the accompanying claims.

Accordingly, the scope of the present invention shall be determined only according to the attached claims.

What is claimed is:

1. A Motor-Driven Power Steering (MDPS), comprising:
   an information detector configured to detect information about behavior of a vehicle; and
   a controller configured to
      receive the information about the behavior of the vehicle from the information detector,
      determine whether the vehicle is accelerating and whether the vehicle pulls to one side, and
      generate compensation torque and drive a steering motor according to the determination of whether the vehicle is accelerating and whether the vehicle pulls to one side,
   wherein the information detector comprises:
      a vehicle speed sensor configured to detect a driving speed of the vehicle;
      a torque sensor configured to detect column torque applied to a steering shaft and to output a column torque signal;
      a steering angle sensor configured to detect a steering angle of a steering wheel;
      an accelerator pedal displacement sensor configured to sense a displacement of an accelerator pedal; and
      a yaw rate sensor configured to sense a yaw rate of the vehicle, and
   wherein the controller comprises:
      a vehicle condition determinator configured to determine whether a driver intends to steer the vehicle based on the steering angle and the column torque;
      an acceleration determinator configured to determine whether the vehicle is accelerating based on the displacement of the accelerator pedal;
      a steering pull determinator configured to determine whether the vehicle pulls to one side based on the yaw rate; and
      a compensation torque generator configured to receive information about whether the driver intends to steer the vehicle from the vehicle condition determinator, to receive information about whether the vehicle is accelerating and information about whether vehicle pulls to one side from the acceleration determinator and the steering pull determinator, respectively, to calculate the compensation torque based on the information, and to output a final compensation current.

2. The MDPS of claim 1, wherein the compensation torque generator receives the driving speed from the vehicle speed sensor and calculates the compensation torque by applying a gain based on a vehicle speed.

3. The MDPS of claim 1, wherein the compensation torque generator calculates the compensation torque for compensating for a steering pull based on the determination that the vehicle pulls to one side, the vehicle is accelerating, and the driver does not intend to steer the vehicle.

4. The MDPS of claim 3, wherein the compensation torque generator cancels the compensation torque by ramping down the compensation torque based on a determination that the vehicle does not pull to one side any longer.

5. The MDPS of claim 1, wherein the controller is further configured to generate the compensation torque and drive the steering motor according to the determination of whether the vehicle is accelerating, whether the vehicle pulls to one side, and whether a driver intends to steer the vehicle.

6. A method for controlling Motor-Driven Power Steering (MDPS), comprising:
   receiving, by a controller, information about behavior of a vehicle from an information detector;
   determining, by the controller, whether a driver intends to steer the vehicle based on the information about the behavior of the vehicle;
   determining, by the controller, whether the vehicle pulls to one side during acceleration based on the information about the behavior of the vehicle;
   calculating, by the controller, compensation torque depending on the determination of whether the driver intends to steer the vehicle and whether the vehicle pulls to one side during acceleration; and
   outputting, by the controller, a final compensation current to a steering motor according to the compensation torque,
   wherein the determining of whether the vehicle pulls to one side during acceleration comprises:
      determining, by the controller, the vehicle is accelerating based on the displacement of the accelerator pedal based on the determination that the driver does not intend to steer the vehicle; and
      determining, by the controller, the vehicle puffs to one side based on the yaw rate based on a determination that the vehicle is accelerating.

7. The method of claim 6, wherein the receiving of the information about the behavior of the vehicle is configured such that the controller receives a driving speed of the vehicle, column torque applied to a steering shaft, a steering angle of a steering wheel, a displacement of an accelerator pedal, and a yaw rate of the vehicle from the information detector.

8. The method of claim 6, wherein the determining of whether the driver intends to steer the vehicle is configured such that the controller determines whether the driver intends to steer the vehicle based on the column torque and the steering angle.

9. The method of claim 6, wherein the calculating of the compensation torque is configured such that the controller receives a driving speed from the information detector and calculates the compensation torque by applying a gain based on a vehicle speed.

10. The method of claim 6, further comprising:
    cancelling, by the controller, the compensation torque by ramping down the compensation torque based on a determination that the vehicle does not pull to one side any longer during acceleration.

* * * * *